United States Patent
Pujar et al.

(10) Patent No.: US 12,404,616 B2
(45) Date of Patent: Sep. 2, 2025

(54) SYSTEMS AND METHODS FOR ROBOTIC ARM END EFFECTOR FOR TAILORED THROUGH THICKNESS REINFORCEMENT

(71) Applicant: Rohr, Inc., Chula Vista, CA (US)

(72) Inventors: Vijay V. Pujar, San Diego, CA (US); Katherine E. Waugh, San Diego, CA (US); Christopher C. Koroly, Spring Valley, CA (US); Peter W. Aziz, San Diego, CA (US); Lamia Salah, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 17/978,104

(22) Filed: Oct. 31, 2022

(65) Prior Publication Data
US 2024/0141571 A1    May 2, 2024

(51) Int. Cl.
*D04H 18/02* (2012.01)
*B29C 70/54* (2006.01)

(52) U.S. Cl.
CPC .............. *D04H 18/02* (2013.01); *B29C 70/54* (2013.01); *D10B 2505/02* (2013.01)

(58) Field of Classification Search
CPC .......... D04H 18/02; D04H 18/00; D04H 1/46; D04H 5/02; D04H 3/102; D04H 3/105; D04H 13/005; D04H 17/10; B29C 70/54; B29C 70/24; B29C 70/38; D05C 9/20; D05C 3/02; D05C 5/00; D05C 5/02; D05C 9/02; D05C 9/04; D05C 9/06; D05B 29/02; D05B 29/00; D05B 29/06; D05B 29/08; D05B 27/06; D05B 27/24; B25J 15/0071
(Continued)

(56) References Cited

U.S. PATENT DOCUMENTS 1,623,075 A    4/1927    Thomas
1,686,439 A    10/1928   Cooke
(Continued)

FOREIGN PATENT DOCUMENTS

CN    105755679 A    *    7/2016    ............. D04H 18/02
CN    105986372 A    *    10/2016   ............. D05B 19/16
(Continued)

OTHER PUBLICATIONS

KR 101935743 (Park) English translation (Doc pub Jan. 2019). (Year: 2019).*
(Continued)

*Primary Examiner* — Amy Vanatta
(74) *Attorney, Agent, or Firm* — SNELL & WILMER L.L.P.

(57) ABSTRACT

An end effector for needling a fibrous preform includes a body (or head), a plurality of articulating presser feet mounted to the body and moveable with respect to the body, and a plurality of articulating needles mounted to the body and moveable with respect to the body. The needles may be configured to move between an extended position and a retracted position. The presser feet may be configured to move between an extended position and a retracted position. The end effector presser feet may conform to complex geometries of a fibrous preform. The end effector may control needling depth, needling density, applied tension and/or pressure on the fibrous preform, and needle angle.

19 Claims, 8 Drawing Sheets

(58) Field of Classification Search
USPC .................................................. 28/107–115
See application file for complete search history.

(56) References Cited

U.S. PATENT DOCUMENTS

| | | | | |
|---|---|---|---|---|
| 2,556,406 | A | | 6/1951 | Wapner |
| 2,601,432 | A | * | 6/1952 | Clements .................. C14B 5/00 |
| | | | | 28/107 |
| 2,690,149 | A | | 9/1954 | Adams |
| 2,896,303 | A | * | 7/1959 | Morrill ................... D04H 18/02 |
| | | | | 28/115 |
| 3,022,813 | A | * | 2/1962 | Glover ................... D04H 1/488 |
| | | | | 28/115 |
| 3,404,646 | A | * | 10/1968 | Des Ormeaux ........ D05B 27/04 |
| | | | | 112/235 |
| 3,605,223 | A | | 9/1971 | Barth |
| 3,611,958 | A | | 10/1971 | Rutledge |
| 3,729,785 | A | | 5/1973 | Sommer |
| 3,889,326 | A | | 6/1975 | Tyas |
| 3,910,210 | A | | 10/1975 | Marforio |
| 3,916,494 | A | * | 11/1975 | Konig ..................... D04H 18/02 |
| | | | | 28/107 |
| 4,305,339 | A | | 12/1981 | Inglis |
| 4,353,158 | A | * | 10/1982 | Henshaw ................ D05B 81/00 |
| | | | | 112/152 |
| 4,369,723 | A | | 1/1983 | Griffith, Jr. |
| 4,777,706 | A | * | 10/1988 | Stanislaw ............... D04H 18/02 |
| | | | | 28/142 |
| 5,016,331 | A | | 5/1991 | Dilo |
| 5,125,135 | A | | 6/1992 | Kalteis |
| 5,226,217 | A | | 7/1993 | Olry et al. |
| 5,511,294 | A | * | 4/1996 | Fehrer ..................... D04H 18/02 |
| | | | | 28/107 |
| 5,513,423 | A | | 5/1996 | Jakob |
| 5,515,798 | A | * | 5/1996 | Cahuzac ................. D04H 18/02 |
| | | | | 112/470.12 |
| 5,564,355 | A | | 10/1996 | Watson |
| 5,699,595 | A | | 12/1997 | Feyerl |
| 5,800,672 | A | | 9/1998 | Boyce et al. |
| 5,894,643 | A | | 4/1999 | Fehrer |
| 5,896,633 | A | * | 4/1999 | Fehrer ..................... D04H 18/02 |
| | | | | 28/103 |
| 6,161,269 | A | * | 12/2000 | Dilo ........................ D04H 18/02 |
| | | | | 28/107 |
| 6,233,797 | B1 | | 5/2001 | Neely |
| 6,360,412 | B1 | * | 3/2002 | Duval ..................... D04H 18/02 |
| | | | | 28/107 |
| 6,374,469 | B1 | * | 4/2002 | Baudry ................... D04H 18/02 |
| | | | | 28/107 |
| 6,405,417 | B1 | | 6/2002 | Sheehan et al. |
| 6,591,769 | B1 | * | 7/2003 | Heidtmann ............ D05B 29/02 |
| | | | | 112/237 |
| 6,735,837 | B2 | * | 5/2004 | Pum ....................... D04H 18/02 |
| | | | | 28/107 |
| 7,296,525 | B2 | | 11/2007 | Cho |
| 7,497,001 | B2 | | 3/2009 | Hall et al. |
| 8,192,662 | B2 | | 6/2012 | Asahara et al. |
| 9,193,113 | B2 | | 11/2015 | La Forest et al. |
| 10,448,706 | B2 | * | 10/2019 | Ho .......................... D05B 55/00 |
| 11,491,745 | B2 | | 11/2022 | Kim et al. |
| 2003/0097740 | A1 | * | 5/2003 | Jourde ................... D04H 18/00 |
| | | | | 28/107 |
| 2003/0136502 | A1 | | 7/2003 | Lavasserie et al. |
| 2003/0209179 | A1 | | 11/2003 | Scordos |
| 2009/0139808 | A1 | | 6/2009 | Bouchard et al. |
| 2009/0301369 | A1 | * | 12/2009 | Kawaguchi ............ D05B 69/10 |
| | | | | 112/235 |
| 2013/0255047 | A1 | * | 10/2013 | Sasur ...................... D04H 18/02 |
| | | | | 28/115 |
| 2013/0255556 | A1 | | 10/2013 | Hasegawa |
| 2014/0310928 | A1 | * | 10/2014 | Kuhl ....................... D04H 18/02 |
| | | | | 28/110 |
| 2015/0152582 | A1 | | 6/2015 | Takizawa |
| 2018/0103724 | A1 | | 4/2018 | Ho |
| 2018/0274144 | A1 | * | 9/2018 | Evrard ..................... D04H 1/46 |
| 2020/0354870 | A1 | * | 11/2020 | Groelz .................... D05B 11/00 |
| 2022/0184880 | A1 | | 6/2022 | Barnes et al. |
| 2023/0295849 | A1 | * | 9/2023 | Deng ...................... D04H 18/02 |
| | | | | 28/107 |

FOREIGN PATENT DOCUMENTS

| | | | | |
|---|---|---|---|---|
| CN | 107268197 A | * | 10/2017 | ............. D05B 35/02 |
| CN | 108103671 | | 6/2018 | |
| CN | 108789447 | | 11/2018 | |
| CN | 110219097 | | 9/2019 | |
| CN | 209779164 | | 12/2019 | |
| CN | 112318499 | | 2/2021 | |
| CN | 114474958 | | 5/2022 | |
| CN | 114703605 | | 7/2022 | |
| CN | 115094575 A | * | 9/2022 | |
| DE | 202013105848 | | 3/2015 | |
| EP | 0484391 | | 9/1995 | |
| EP | 1384804 | | 1/2004 | |
| EP | 4144904 | | 3/2023 | |
| EP | 4461860 | | 11/2024 | |
| FR | 2794138 | | 12/2000 | |
| GB | 2310221 | | 8/1997 | |
| KR | 20100064344 A | * | 6/2014 | |
| KR | 101935743 B1 | * | 1/2019 | |

OTHER PUBLICATIONS

European Patent Office, European Partial Search Report dated Apr. 16, 2024 in Application No. 23204626.8.
USPTO; Requirement for Restriction dated Apr. 18, 2024 in U.S. Appl. No. 18/165,238.
USPTO; Requirement for Restriction dated Apr. 18, 2024 in U.S. Appl. No. 18/165,271.
European Patent Office, European Search Report dated Jul. 8, 2024 in Application No. 23204626.8.
European Patent Office, European Search Report dated Feb. 16, 2024 in Application No. 23204703.5.
European Patent Office, European Search Report dated Feb. 16, 2024 in Application No. 23204191.3.
European Patent Office, European Office Action dated Dec. 10, 2024 in Application No. 23204703.5.
USPTO; Non-Final Office Action dated Aug. 29, 2024 in U.S. Appl. No. 18/165,238.
USPTO; Non-Final Office Action dated Sep. 5, 2024 in U.S. Appl. No. 18/165,271.
USPTO; Notice of Allowance dated Jan. 16, 2025 in U.S. Appl. No. 18/165,238.
USPTO; Notice of Allowance dated Jan. 27, 2025 in U.S. Appl. No. 18/165,271.
European Patent Office, European Search Report dated Jun. 2, 2025 in Application No. 25150463.5.

* cited by examiner

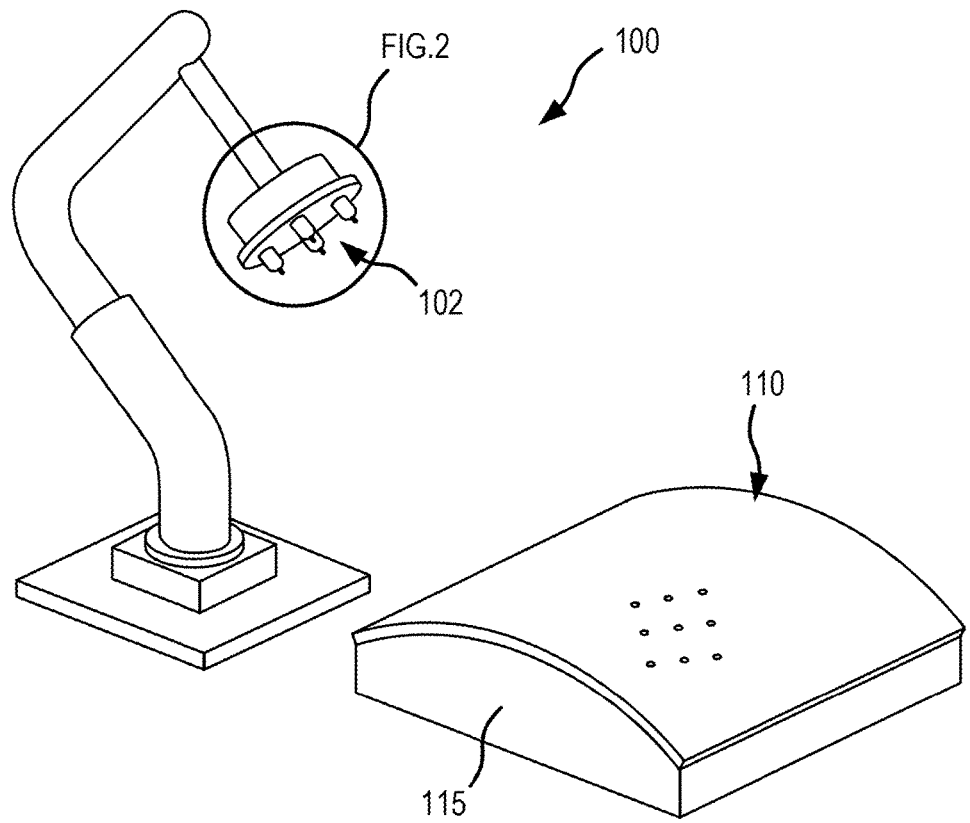
FIG. 1
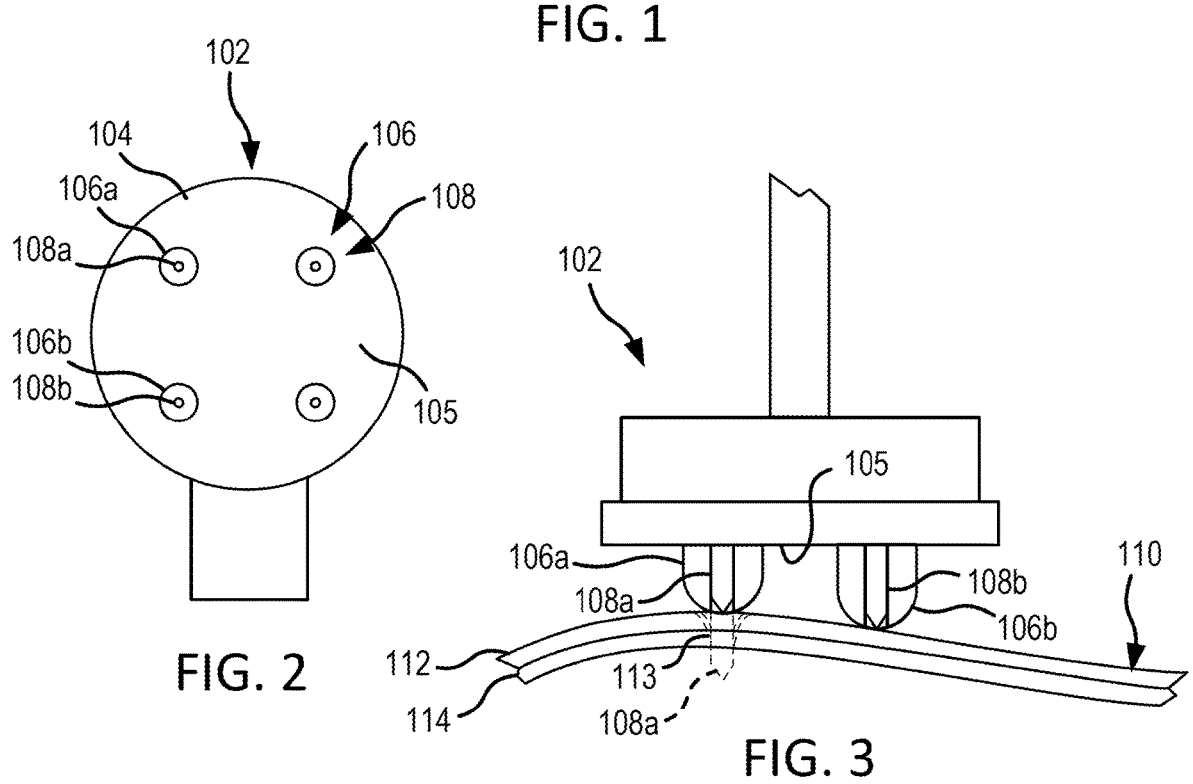
FIG. 2
FIG. 3

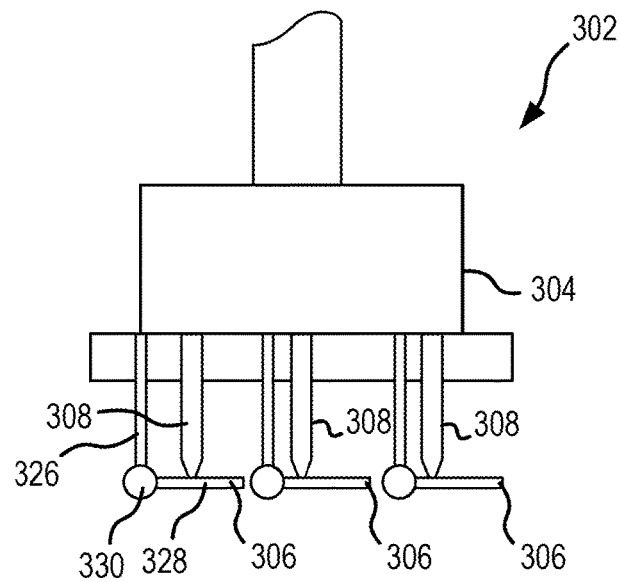
FIG. 8
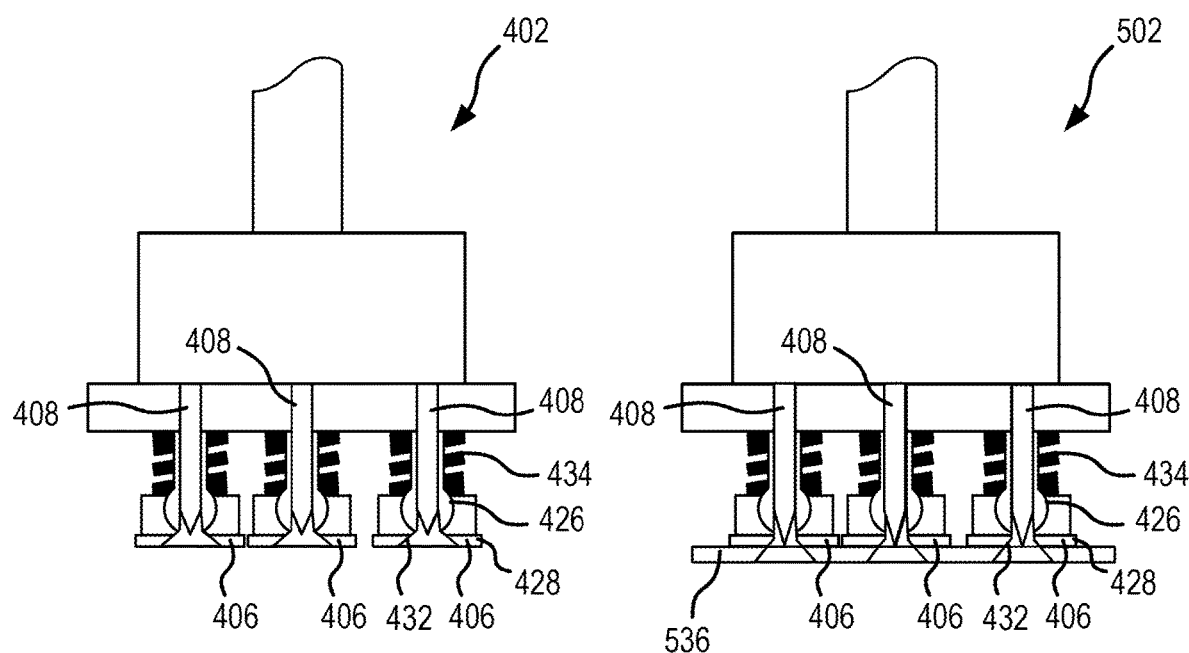
FIG. 9
FIG. 10

SYSTEMS AND METHODS FOR ROBOTIC ARM END EFFECTOR FOR TAILORED THROUGH THICKNESS REINFORCEMENT

FIELD

The present disclosure relates generally to the use of robotic arm end effectors during the preparing of materials during the process of laying up and manufacture and, more particularly, to through-thickness reinforcement of complex contour materials.

BACKGROUND

Composites with through-thickness reinforcement generally provide higher interlaminar properties but lower in-plane properties compared to 2D lay-ups. Composite structures for aerospace applications sometimes have complex contours to meet aerodynamic and thermal requirements. Additionally, it is desirable for composite structures to be designed to withstand in-plane and interlaminar stresses. These stresses can vary across the structure.

SUMMARY

An end effector for through thickness reinforcement of a fibrous preform is disclosed, comprising a body, a first presser foot mounted to the body and moveable with respect to the body, and a first needle mounted to the body and moveable with respect to the body. The first needle is configured to move between a first extended position and a first retracted position.

In various embodiments, the first presser foot is configured to move between a second extended position and a second retracted position.

In various embodiments, the end effector further comprises a second presser foot, wherein the first presser foot is configured to articulate independent of the second presser foot.

In various embodiments, the first presser foot is moveable with respect to the first needle.

In various embodiments, the end effector further comprises a second needle and a second presser foot. The first needle extends through the first presser foot and the second needle extends through the second presser foot.

In various embodiments, the first presser foot comprises a pivoting foot section pivotally mounted to a spherical joint.

In various embodiments, the end effector further comprises a flexible material provided at an end of the pivoting foot section, wherein the flexible material extends between adjacent pivoting foot sections.

In various embodiments, the end effector further comprises a spring member configured to bias the first presser foot.

In various embodiments, the end effector further comprises an actuator for moving the first presser foot between the second extended position and the second retracted position.

In various embodiments, the end effector further comprises an actuator for moving the first needle between the first extended position and the first retracted position.

In various embodiments, the end effector further comprises a preform tensioner configured to contact the fibrous preform to apply tension to the fibrous preform while the first needle moves between the first extended position to the first retracted position.

A method for performing a process of through-thickness reinforcement in a fibrous preform is disclosed, in accordance with various embodiments. The method comprises moving an end effector with respect to the fibrous preform, moving the end effector toward the fibrous preform until a first presser foot of the end effector contacts the fibrous preform, moving a first needle of the end effector from a first retracted position to a first extended position, penetrating the fibrous preform with the first needle in response to the first needle moving from the first retracted position to the first extended position, and moving at least a portion of a fiber from a first layer of the fibrous preform into a second layer of the fibrous preform in response to the first needle penetrating the fibrous preform.

In various embodiments, the method further comprises receiving, by a control unit, a feedback signal from a sensor indicating a pressure exerted by the first presser foot onto the fibrous preform.

In various embodiments, the method further comprises orienting the first needle at a non-orthogonal angle with respect to the fibrous preform. The fibrous preform may have a contoured surface (i.e., is not flat) at the location of the first needle.

In various embodiments, the method further comprises moving a second presser foot of the end effector from a second retracted position to a second extended position.

In various embodiments, the method further comprises receiving, by a control unit, a feedback signal from a sensor indicating a pressure exerted by the first needle onto the fibrous preform.

A method for performing a process of through-thickness reinforcement in a fibrous preform is disclosed, in accordance with various embodiments. The method comprises moving an end effector with respect to the fibrous preform, moving the end effector toward the fibrous preform until a first presser foot of the end effector contacts the fibrous preform, receiving a first pressure signal from a first sensor indicating a first pressure applied by the first presser foot onto the fibrous preform, moving a second presser foot of the end effector from a first retracted position to a first extended position, receiving a second pressure signal from a second sensor indicating a second pressure applied by the second presser foot onto the fibrous preform, moving a first needle of the end effector from a second retracted position to a second extended position, moving a second needle of the end effector from a third retracted position to a third extended position, penetrating the fibrous preform with the first needle in response to the first needle moving from the second retracted position to the second extended position, penetrating the fibrous preform with the second needle in response to the second needle moving from the third retracted position to the third extended position, moving at least a portion of a first fiber from a first layer of the fibrous preform into a second layer of the fibrous preform in response to the first needle penetrating the fibrous preform, moving at least a portion of a second fiber from the first layer of the fibrous preform into the second layer of the fibrous preform in response to the second needle penetrating the fibrous preform.

In various embodiments, the method further comprises moving the end effector toward the fibrous preform until the first pressure signal indicates the first pressure applied by the first presser foot is equal to or greater than a predetermined pressure threshold.

In various embodiments, the method further comprises continuing to extend the second presser foot until the second pressure signal indicates the second pressure applied by the second presser foot is equal to or greater than the predetermined pressure threshold.

In various embodiments, the method further comprises pivoting the first presser foot in response to the first presser foot contacting the fibrous preform.

In various embodiments, the method further comprises penetrating the fibrous preform at a first depth in response to moving the first needle to the second extended position, and penetrating the fibrous preform at a second depth in response to moving the second needle of the end effector to the third extended position, wherein the first depth is different from the second depth.

In various embodiments, the needle may be configured with one or more barbs along the length of the needle, wherein each barb is designed to entrain or capture one or more fibrous filaments within a ply or layer of the fibrous preform. In various embodiments, as the needle penetrates the fibrous preform, at least a portion of the entrained fibrous filaments in the barbs are transported along the direction of the penetrating needle to provide through-thickness reinforcement. In various embodiments, the needle may be alternatively or additionally configured to be a stitching or a tufting needle with an eye to transport fibrous filament along the direction of the penetration.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

FIG. 1 is a perspective illustration of an exemplary robotic arm comprising an end effector during a through thickness reinforcement process of a fibrous preform, in accordance with various embodiments;

FIG. 2 is an illustration of a face of the end effector of FIG. 1, in accordance with various embodiments;

FIG. 3 is a schematic sectional illustration of the end effector during a through thickness reinforcement process, in accordance with various embodiments;

FIG. 8 is a schematic sectional illustration of an end effector having presser feet that include pivoting foot sections, in accordance with various embodiments;

FIG. 9 is a schematic sectional illustration of an end effector having presser feet that include pivoting foot sections pivotally mounted to spherical joints, in accordance with various embodiments;

FIG. 10 is a schematic sectional illustration of an end effector having a flexible material coupled to the ends of the presser feet, in accordance with various embodiments;

DETAILED DESCRIPTION

Figure 4C:
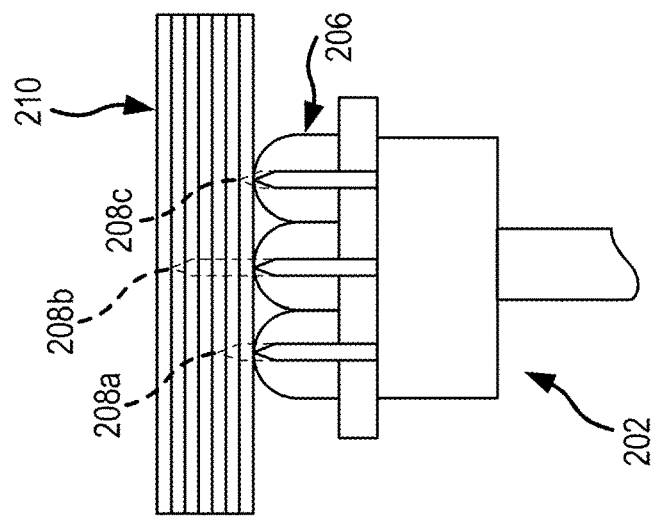
FIG. 4A, FIG. 4B, and FIG. 4C are schematic sectional illustrations of the end effector during a through thickness reinforcement process with the end effector nominally normal to a flat portion of the fibrous preform, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

As used herein, the term "through thickness reinforcement" includes "needling," "stitching," and/or "tufting," in accordance with various embodiments.

As used herein, the term "needling" includes "stitching" and/or "tufting," in accordance with various embodiments.

With reference to FIG. 1, a robotic arm 100 comprising an end effector 102 is illustrated during a through thickness reinforcement process of a fibrous preform 110, in accordance with various embodiments. Fibrous preform 110 may be placed over a tool 115 and formed to the geometry of the tool 115. In this manner, fibrous preform 110 may be shaped into a complex contour preform (e.g., bent about one or more axes). Robotic arm 100 may be configured to move the end effector 102 with respect to the fibrous preform 110 in a controlled manner to perform a through thickness reinforcement process, i.e. Z-needling. Z-needling refers to a process comprising penetrating a composite material (e.g., fibrous preform 110) with needles and moving (e.g., by pulling or pushing) fibers from the in-plane direction and forcing them into the Z direction, where the "Z direction" as used herein refers to a direction perpendicular to the in-plane direction. For preforms having curved surfaces, the "Z-direction" refers to the direction normal to a (local) surface of the fibrous preform at the point where the preform is being needled (i.e., a direction normal to the tangent plane to the surface at the point of needling). In general, the through thickness reinforcement process has the effect of interlocking individual fabric layers together. Thus, after through thickness reinforcement, the fibrous material has fibers extending in three different directions (i.e., in the X and Y directions in the plane of the fibrous layers and the Z direction perpendicular to the fibrous layers). It should be appreciated that due to the complex contours of the fibrous preform 110, the X, Y, and Z directions vary depending on the particular location of the fibrous preform 110.

With reference to FIG. 2, a view of the face of end effector 102 is illustrated, in accordance with various embodiments. End effector 102 may comprise a head or body 104, a plurality of presser feet 106 (e.g., first presser foot 106a, second presser foot 106b, etc.), and a plurality of needles 108 (e.g., first needle 108a, second needle 108b, etc.). Body 104 may be made from a metal material, a composite material, or a plastic material. Body 104 may house various components for actuating presser feet 106 and/or needles 108. Presser feet 106 may be moveable with respect to body 104. Presser feet 106 may be moveable with respect to needles 108. Needles 108 may be moveable with respect to body 104. Needles 108 may be moveable with respect to presser feet 106. A face 105 of the body may be flat or planar. Face 105 may face the fibrous preform during the through thickness reinforcement process. In various embodiments, presser feet 106 and needles 108 extend from face 105.

In various embodiments, each presser foot 106 comprises a cylindrical body with a hemispherical-shaped end; though other presser foot 106 shapes and/or designs are contemplated herein. Each presser foot 106 may be made from a metal material, a rubber material, or a plastic material. The material of presser foot 106 may be selected based on the desired pressure exerted onto fibrous preform 110, among other factors.

In various embodiments, each needle 108 may be made from a metal material or a polymer material or a ceramic material or combinations thereof. For example, the needle may be a metal material with a polymer coating or it may be a metal material with a ceramic coating. The material and coating system of needle 108 may be selected depending on the material of fibrous preform 110, among other factors.

With reference to FIG. 3, end effector 102 is illustrated during a through thickness reinforcement process of fibrous preform 110. Fibrous preform 110 may comprise a first layer 112 and a second layer 114. First layer 112 may be a top layer. Each layer of material may share a common (e.g., the same) construction and/or material makeup. Each layer of material, for example, may be formed by a sheet/layer of fibrous material; e.g., woven carbon fiber, woven oxidized polyacrylonitrile (PAN) fibers, non-crimp fabric, etc. One or more or all of the layers of material may each be impregnated with a polymer matrix; e.g., thermoset material or thermoplastic material. One or more or all of the layers of material may alternatively each be unimpregnated (e.g., only include the fibrous material) where, for example, the preform material is impregnated subsequent to formation of the composite structure. The method of the present disclosure, however, is not limited to such exemplary layer materials.

End effector 102 may be moved (e.g., via robotic arm 100) with respect to fibrous preform 110. With the end effector 102 in the desired position, one or more needles may be actuated to penetrate fibrous preform 110, thereby moving one or more fibers 113 from first layer 112 into second layer 114 and interlocking first layer 112 with second layer 114. For example, needle 108a is illustrated in FIG. 3 moving from a non-penetrating position to a penetrating position (also referred to herein as a retracted position (see needle 108b) and an extended position (see needle 108a), respectively). In this regard, needles 108 may be referred to herein as articulating needles. Needle 108b may be similarly operated. Needles 108a and 108b can be controlled individually or in groups by programmable robotic system (e.g., see control unit 250 of FIG. 5B and FIG. 5C) to puncture the plies of fibrous preform 110 to a desired depth and/or a desired needling density (e.g., various needles 108 may be commanded not to penetrate the fibrous preform to vary a needling density (i.e., number of needles per unit area)). The needles 108a and 108b may be configured to puncture the fibers in the top ply or a sacrificial ply layer into the adjacent plies at the desired angle and depth. The end effector 102 may be rotated to appropriate angles to needle plies at different desired angles (e.g., see FIG. 4A through FIG. 7C, FIG. 14, and FIG. 15).

FIG. 3 illustrates presser foot 106a in a retracted position and presser foot 106b in an extended position, whereby the presser feet 106. In this regard, presser feet 106 may be referred to herein as articulating presser feet.

Figure 4B:
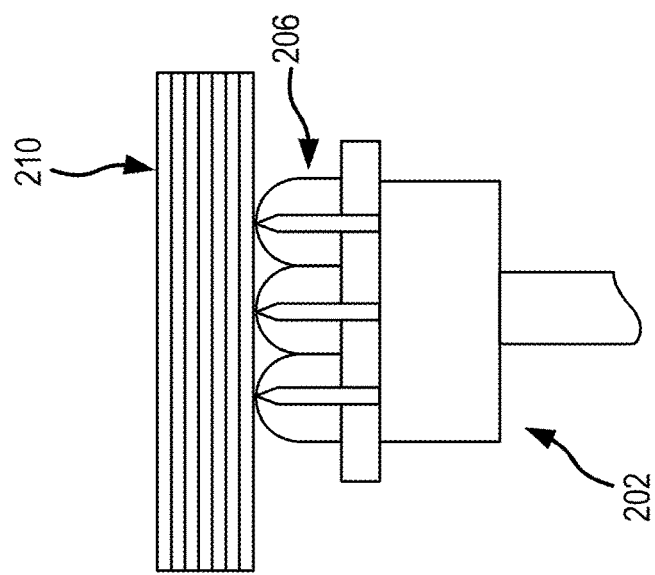
Figure 4A:
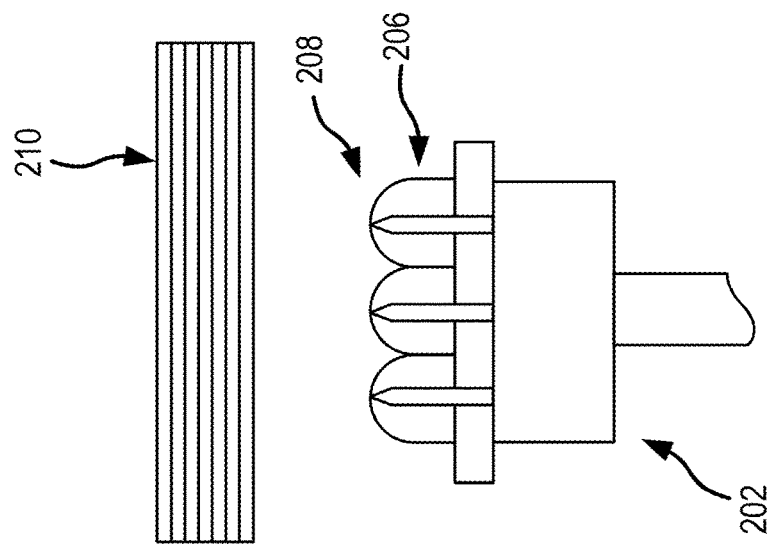

With reference to FIG. 4A, FIG. 4B, and FIG. 4C, an end effector 202 is illustrated during a through thickness reinforcement process of fibrous preform 210, in accordance with various embodiments. End effector 202 may be similar to end effector 102 (see FIG. 1) in various embodiments. FIG. 4A illustrates end effector 202 moved with respect to fibrous preform 210. For example, end effector 202 may be oriented at a desired angle with respect to fibrous preform 210. End effector 202 may be moved toward fibrous preform 210 until one or more presser feet 206 contact fibrous preform 210. For example, presser feet 206 may exert a desired pressure on fibrous preform 210 to secure fibrous preform 210 during the through thickness reinforcement process.

Each needle 208 may be actuated independently so as to independently control a penetrating depth of each needle 208. For example, a first needle 208a may actuated to penetrate a first predetermined number of layers of fibrous preform 210, such as three layers for example, a second needle 208b may actuated to penetrate a second predetermined number of layers of fibrous preform 210, such as six layers for example, and a third needle 208c may actuated to penetrate a third predetermined number of layers of fibrous preform 210, such as two layers for example. Although penetration of three, six, and two layers is provided as an example, any number of layers of fibrous preform 210 may be penetrated by needles 208 as desired depending on the desired amount of interlocking of adjacent layers. In this regard, first needle 208a may be actuated to penetrate a first number of layers of the fibrous preform and the second needle 208b may be simultaneously, or nearly simultaneously, actuated to penetrate a second number of layers of the fibrous preform 210, wherein the first number of layers is different from the second number of layers. Stated differently, first needle 208a may penetrate the fibrous preform 210 at a first depth and second needle 208b may penetrate the fibrous preform 210 at a second depth, different from the first depth. For example, one or more layers be omitted from the through thickness reinforcement process to allow for said layer(s) to move with respect to one another during the forming process to avoid wrinkling. In various embodiments, one or more layers may be omitted from the through thickness reinforcement process depending on the desired interlaminar preform mechanical properties, through thickness thermal conductivity, and/or other fiber dominated properties. Moreover, by independently controlling each needle, the frequency of needling may be varied as desired. Having discussed the independent control of the needles 208, the presser feet 206 may be similarly independently controlled.

Figure 5C:
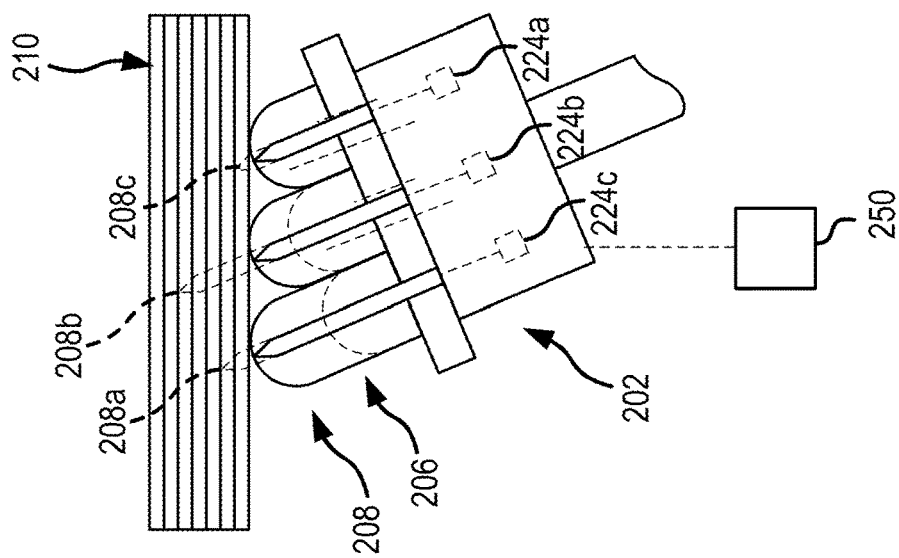
FIG. 5A, FIG. 5B, and FIG. 5C are schematic sectional illustrations of the end effector during a through thickness reinforcement process with the end effector at an angle with respect to a flat portion of the fibrous preform, in accordance with various embodiments.
Figure 5B:
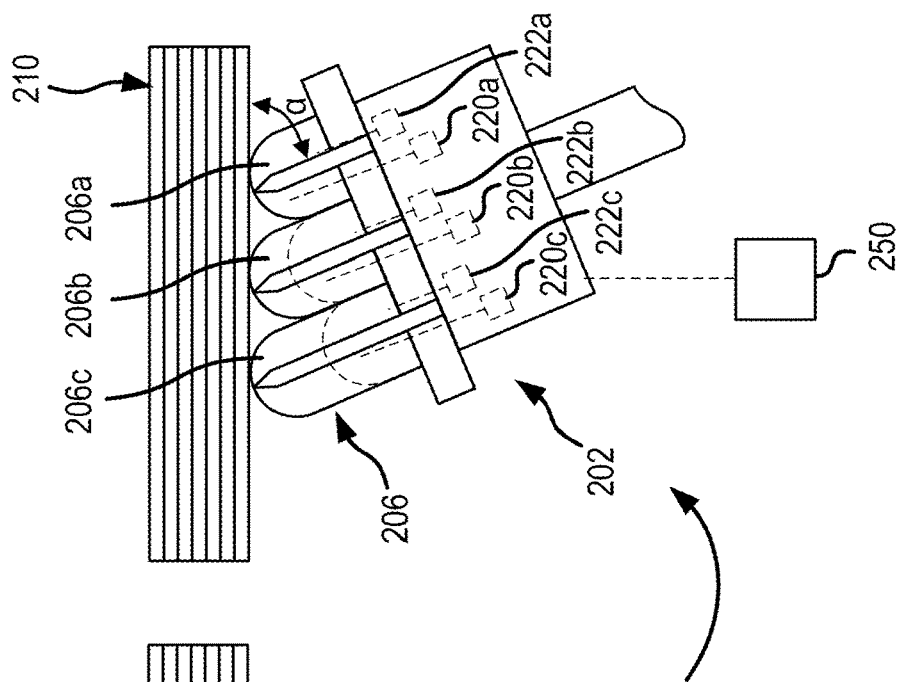
Figure 5A:
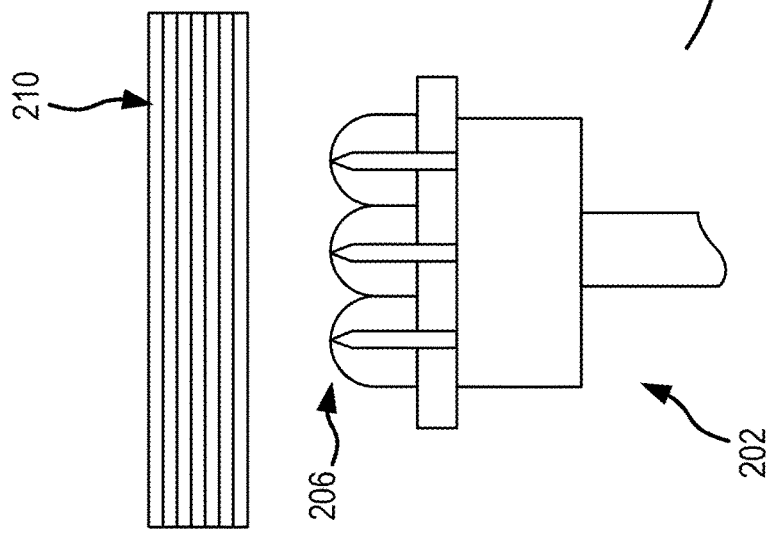

With reference to FIG. 5A, FIG. 5B, and FIG. 5C, end effector 202 is illustrated during a through thickness reinforcement process of fibrous preform 210, in accordance with various embodiments. FIG. 5A illustrates end effector 202 moved with respect to fibrous preform 210. FIG. 5B illustrates end effector 202 oriented at a desired angle α with respect to fibrous preform 210. In various embodiments, angle α is an angle of the centerline of a needle 208 with respect to the fibrous preform. Angle α may be between twenty degrees and ninety degrees in accordance with various embodiments, between thirty degrees and eighty degrees in accordance with various embodiments, or between twenty five degrees and eighty degrees in accordance with various embodiments. End effector 202 may be moved toward fibrous preform 210 until one or more presser feet 206 contact fibrous preform 210. For example, presser feet 206 may exert a desired pressure on fibrous preform 210 to secure fibrous preform 210 during the through thickness reinforcement process.

In various embodiments, the end effector 202 further includes a control unit 250, which includes one or more controllers (e.g., processors) and one or more tangible, non-transitory memories capable of implementing digital or programmatic logic. In various embodiments, for example, the one or more controllers are one or more of a general purpose processor, digital signal processor (DSP), application specific integrated circuit (ASIC), field programmable gate array (FPGA), or other programmable logic device, discrete gate, transistor logic, or discrete hardware components, or any various combinations thereof or the like. In various embodiments, the control unit 250 controls, at least various parts of, and operation of various components of, the end effector 202. For example, the control unit 250 may control a position of end effector 202 with respect to fibrous preform 210, the position of presser feet 206 (e.g., via actuators 222a, 222b, 222c), the position of needles 208 (e.g., via actuators 224a, 224b, 224c), and may receive feedback from sensors 220a, 220b, 220c.

In various embodiments, end effector 202 further includes a touch or pressure sensor for each presser foot 206. For example, first presser foot 206a may comprise a first sensor 220a, second presser foot 206b may comprise a second sensor 220b, and third presser foot 206c may comprise a third sensor 220c. In various embodiments, the robotic arm moves the end effector 202 toward the fibrous preform 210 until at least one sensor (e.g., sensor 220a) detects that presser foot 206a has contacted fibrous preform 210. In various embodiments, control unit 250 detects (via sensor 220a) that presser foot 206a has contacted fibrous preform 210 and is exerting a predetermined force or pressure on the fibrous preform 210, which may ensure that presser foot 206a secures the fibrous preform 210 during the through thickness reinforcement process. For example, the robotic arm may monitor the pressure feedback signal from sensor 220a and continue to press the presser foot 206a into fibrous preform 210 until the pressure feedback signal indicates that presser foot 206a is exerting a pressure greater than or equal to a predetermined pressure threshold.

In various embodiments, once at least one presser foot 206a contacts the fibrous preform 210, end effector 202 may be actuated to extend presser foot 206b and presser foot 206c until control unit 250 detects (via sensors 220b and 220c) that presser feet 206b and 206c, respectively, have contacted fibrous preform 210 (and in various embodiments detect that presser feet 206b and 206c are exerting a predetermined force or pressure on the fibrous preform 210). In this regard, each sensor 220a, 220b, and 220c—schematically illustrated in FIG. 5B—may comprise a touch sensors and/or a pressure sensor. In various embodiments, sensors 220a, 220b, 220c may comprise multi-axial sensors to measure force in different directions.

In various embodiments, end effector 202 further includes an actuator for each presser foot 206. For example, each presser feet 206a, 206b, and 206c may comprise actuators 222a, 222b, and 222c, respectively, for extending and/or retracting the respective presser foot 206a, 206b, and 206c. Actuators 222a, 222b, and 222c—schematically illustrated in FIG. 5B—may be linear actuators or rotary actuators. Actuators 222a, 222b, and 222c may be pneumatic actuators, electric actuators, or hydraulic actuators.

In various embodiments, control unit 250 receives feedback from sensors 220a, 220b, 220c for closed-loop control of the position of presser feet 206. For example, presser foot 206a may be extended until a pressure feedback signal received from the associated sensor 220a indicates that the presser foot 206a is exerting a predetermined pressure on the fibrous preform 210.

FIG. 5C illustrates the needles 208 in extended positions during the through thickness reinforcement process. In various embodiments, end effector 202 further includes an actuator for each needle 208. In various embodiments, each actuator may actuate a single needle or a zone of needles (e.g., a row of needles or a column of needles in accordance with various embodiments). Needles 208 may be actuated independent of the position of the presser feet 206. In the illustrated embodiments, needles 208a, 208b, and 208c comprise actuators 224a, 224b, and 224c, respectively, for extending and/or retracting the respective needle 208a, 208b, and 208c.

In various embodiments, control unit 250 may monitor pressure exerted by the needles 208 to alert for needle breaking and/or proper loading of fibers of the fibrous preform 210.

Figure 6C:
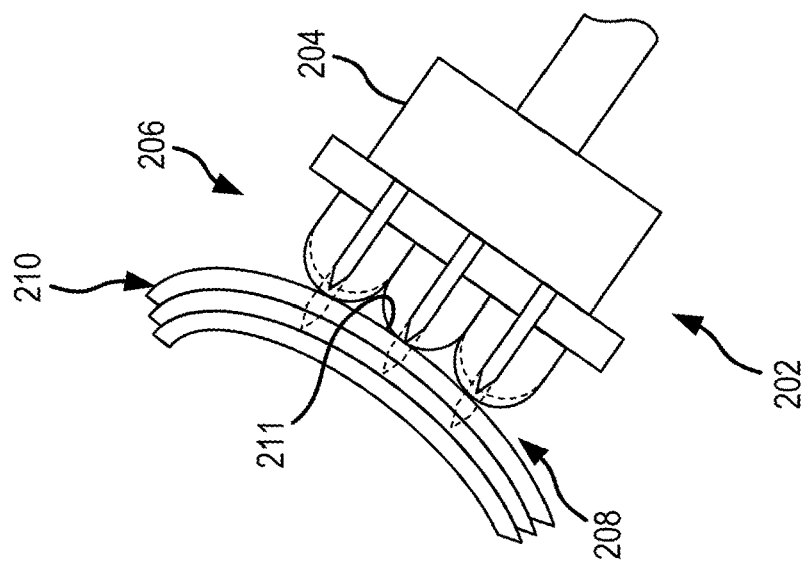
FIG. 6A, FIG. 6B, and FIG. 6C are schematic sectional illustrations of the end effector during a through thickness reinforcement process with the end effector nominally normal to a rounded portion of the fibrous preform, in accordance with various embodiments.
Figure 6B:
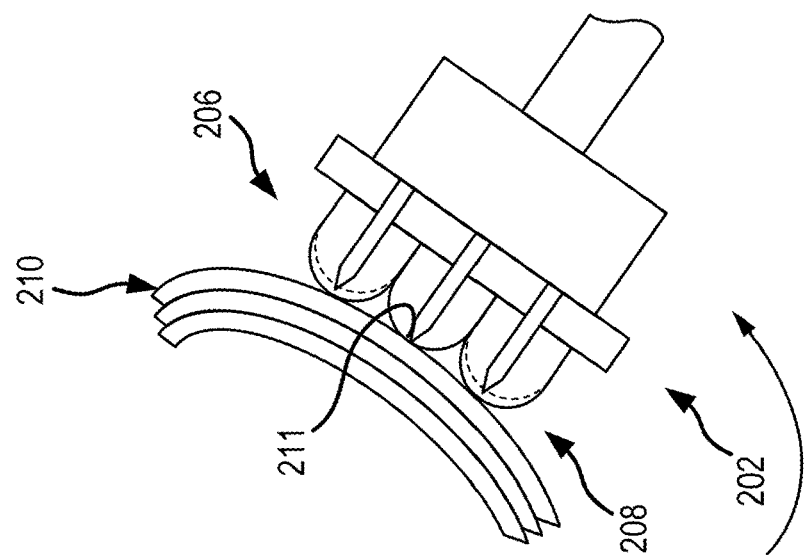
Figure 6A:
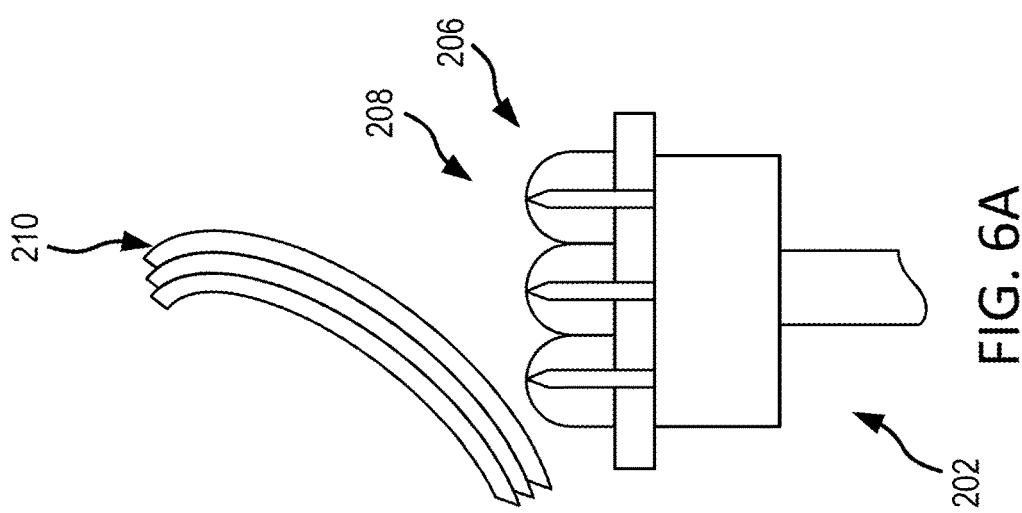

With reference to FIG. 6A, FIG. 6B, and FIG. 6C, end effector 202 may be particularly useful for portions of fibrous preform 210 which are rounded or have complex contours due to the ability of the presser feet 206 to conform to a curved surface of the fibrous preform 210. In the illustrated embodiment, and with particular focus on FIG. 6B, end effector 202 may be oriented nominally normal to the surface 211 of the fibrous preform 210. In various embodiments, a centrally located presser foot 206b may first contact the surface 211 and the surrounding presser feet 206a and 206c may be actuated to extend to contact the surface 211 to provide uniform pressure on the fibrous preform during the through thickness reinforcement process (see FIG. 6C); though in various embodiments a non-centrally located presser foot may first contact the fibrous preform 210 and centrally located presser feet may be actuated to contact the fibrous preform 210.

With particular focus on FIG. 6C, needles 208 and/or presser feet 206 may be configured to articulate (e.g., pivot) to maintain needles 208 and/or presser feet 206 nominally perpendicular to the surface 211 of the fibrous preform 210. For example, needles 208 and/or presser feet 206 may be mounted to a pivot, such as a ball joint or the like, to accommodate rotation of the needles 208 and/or presser feet 206 with respect to body 204 of end effector 202.

Figure 7C:
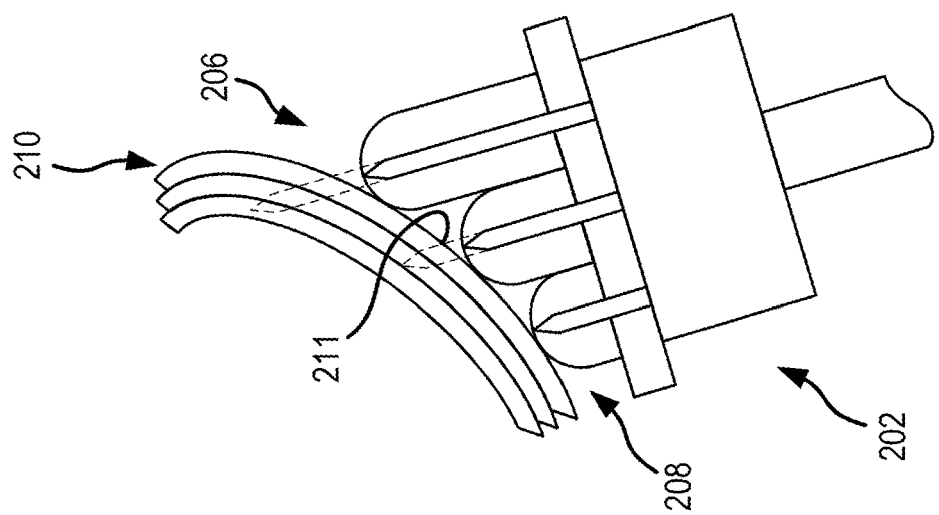
FIG. 7A, FIG. 7B, and FIG. 7C are schematic sectional illustrations of the end effector during a through thickness reinforcement process with the end effector at an angle with respect to a rounded portion of the fibrous preform, in accordance with various embodiments.
Figure 7B:
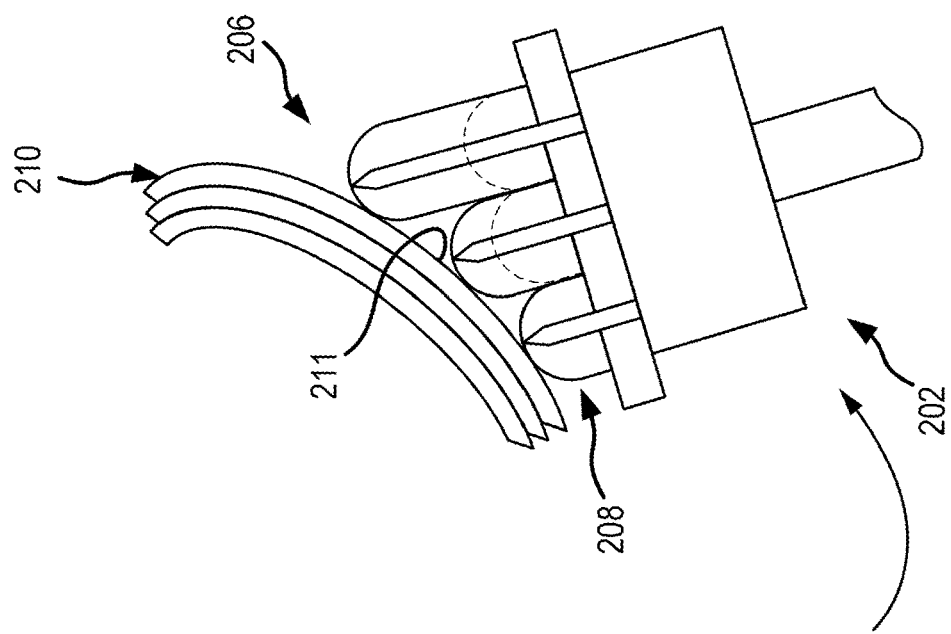
Figure 7A:
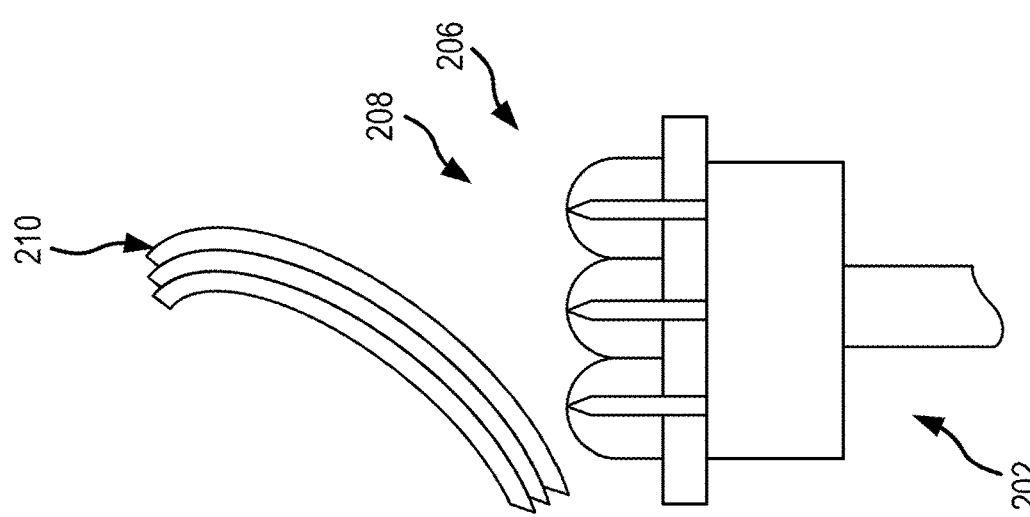

With reference to FIG. 7A, FIG. 7B, and FIG. 7C, a through thickness reinforcement process using end effector 202 is illustrated at a curved portion of fibrous preform 210 similar to FIG. 6A through FIG. 6C, except that end effector 202 is oriented at an angle with respect to the surface 211 of the fibrous preform 210. In this regard, needles 208 may penetrate the plies of the fibrous preform 210 at a non-orthogonal angle during the through thickness reinforcement process.

With reference to FIG. 8, an end effector 302 is illustrated, in accordance with various embodiments. End effector 302 may be similar to end effector 102 (see FIG. 1) in various embodiments. End effector 302 comprises a plurality of needles 308 and a plurality of pivoting presser feet 306, in accordance with various embodiments. Each pivoting presser foot 306 may comprise a support leg 326 mounted to body 304 and a pivoting foot section 328 pivotally mounted to support leg 326 via a pivot 330. In this manner, pivoting foot section 328 may pivot to apply uniform pressure on the fibrous preform during the through thickness reinforcement process. In various embodiments, needle 308 extends through a portion of pivoting foot section 328.

With reference to FIG. 9, an end effector 402 is illustrated, in accordance with various embodiments. End effector 402 may be similar to end effector 102 (see FIG. 1) in various embodiments. End effector 402 comprises a plurality of needles 408 and a plurality of pivoting presser feet 406, in accordance with various embodiments. Each pivoting presser foot 406 may comprise a spherical joint 426 mounted to body 404 and a pivoting foot section 428 pivotally mounted to spherical joint 426. In this manner, pivoting foot section 428 may pivot to apply uniform pressure on the fibrous preform during the through thickness reinforcement process. Spherical joint 426 may accommodate multi-axial rotation of pivoting foot section 428.

Needle 408 may extend through spherical joint 426. Needle 408 may extend through pivoting foot section 428. In this regard, pivoting foot section 428 may comprise an aperture 432 extending therethrough. Aperture 432 may be tapered to accommodate needle 408 (i.e., provide clearance for needle 408) as pivoting foot section 428 pivots about spherical joint 426. A spring member 434 may bias pivoting foot section 428 to a centered position (e.g., wherein the central axis of pivoting foot section 428 is generally coaxial with the central axis of needle 408). Spring member 434 may be tailored to provide a desired amount of pressure on the fibrous preform during the through thickness reinforcement process. Needle 408 and spherical joint 426 may extend at least partially through spring member 434. In various embodiments, spring member 434 is a coil spring. It is further contemplated that spring member 434 may be replaced with a solid link that is mechanically or electrically controlled to articulate pivoting foot section 428.

With reference to FIG. 10, an end effector 502 is illustrated, in accordance with various embodiments. End effector 502 may be similar to end effector 102 (see FIG. 1) in various embodiments. End effector 502 may be similar to end effector 402 except that end effector 502 further includes a conformable, flexible material 536 extending between and to adjacent pivoting foot sections 428 to create a contiguous or discontinuous surface for uniform compression of the fibrous preform during the through thickness reinforcement process. In this manner, flexible material 536 may be provided at the ends of the pivoting foot sections 428 such that the flexible material 536 contacts the fibrous preform during the needling process. In various embodiments, flexible material 536 comprises a flexible material such as silicone or rubber, among others.

Figure 11:
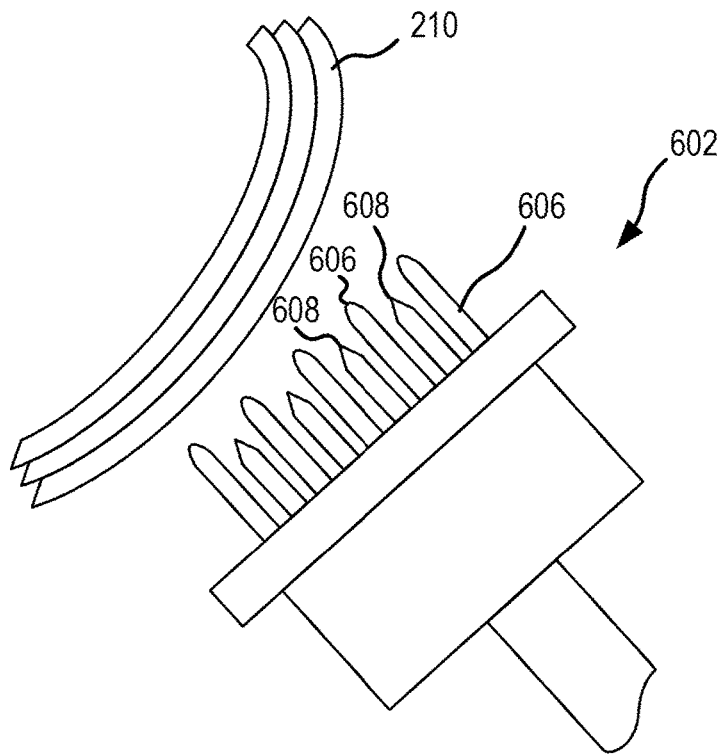
FIG. 11 is a schematic sectional illustration of an end effector having an array of retractable presser feet disposed adjacent and alternating with an array of retractable needles, in accordance with various embodiments.

With reference to FIG. 11, an end effector 602 is illustrated having an array of retractable presser feet 606 disposed adjacent and alternating with an array of retractable needles 608. In this manner, although various embodiments of the present disclosure are illustrated with needles coaxially aligned with (e.g., extending through) corresponding presser feet, it is further contemplated that the needles 608 be disposed adjacent to the presser feet 606. The presser feet 606 may be programmed to conform and compact the surface of the fibrous preform 210. The needles 608 may be programmed to penetrate the fibrous preform 210 to a desired depth.

Figure 12:
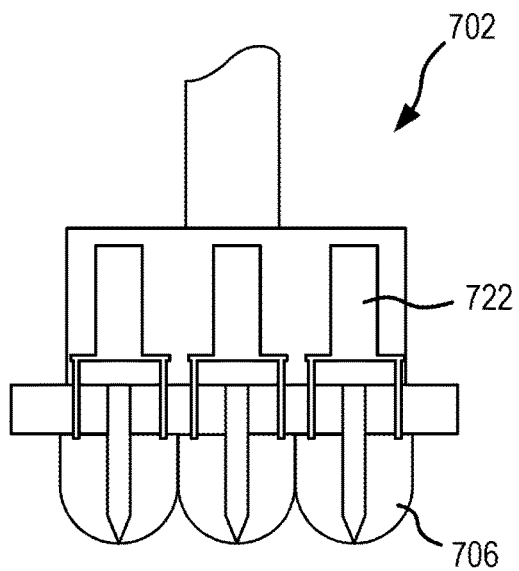
FIG. 12 is a schematic sectional illustration of an end effector having an actively controlled array of retractable presser feet, in accordance with various embodiments.

With reference to FIG. 12, an end effector 702 is illustrated having an actively controlled array of retractable presser feet 706. In this manner, actuators 722 may be provided for controlling a position of the retractable presser feet 706.

Figure 13:
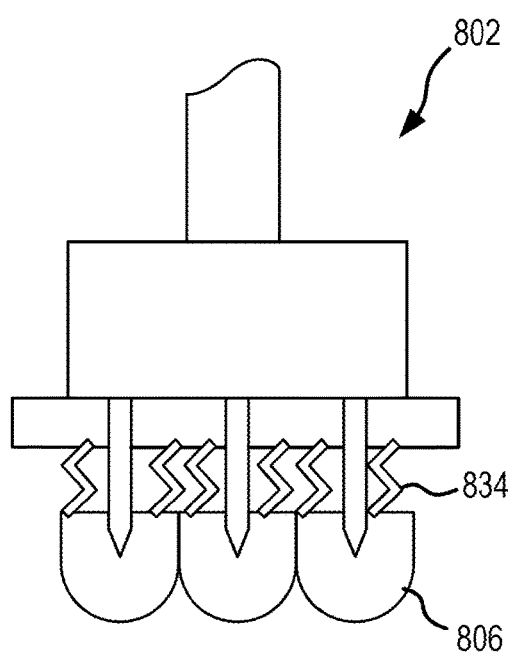
FIG. 13 is a schematic sectional illustration of an end effector having a passively controlled array of retractable presser feet, in accordance with various embodiments.

With reference to FIG. 13, an end effector 802 is illustrated having a passively controlled array of retractable presser feet 806. In this manner, tuned spring members 834 may be provided for biasing presser feet 806 toward extended positions.

Figure 14:
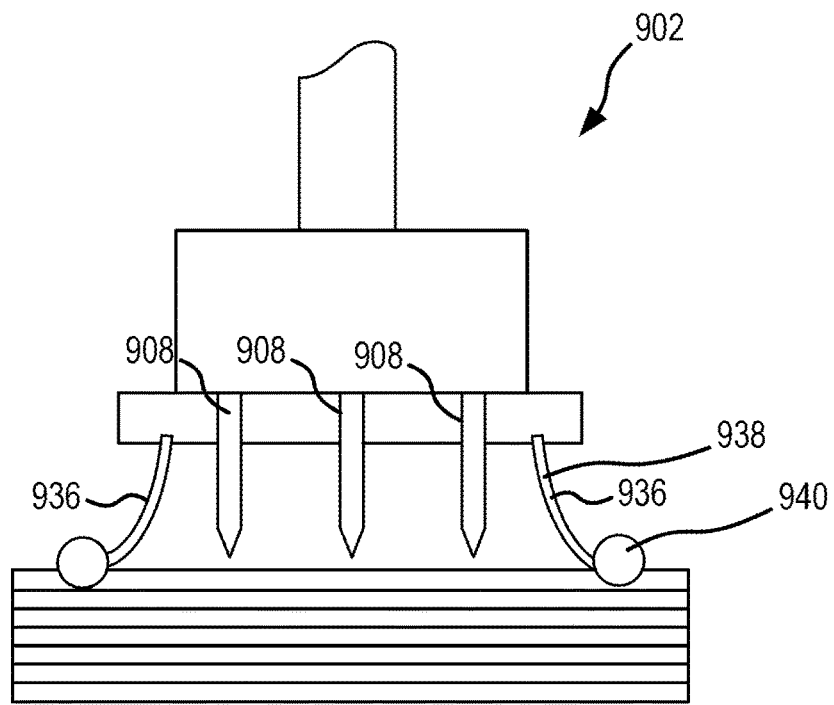
FIG. 14 and FIG. 15 are a schematic sectional illustrations of end effectors having preform tensioners, in accordance with various embodiments.
Figure 15:
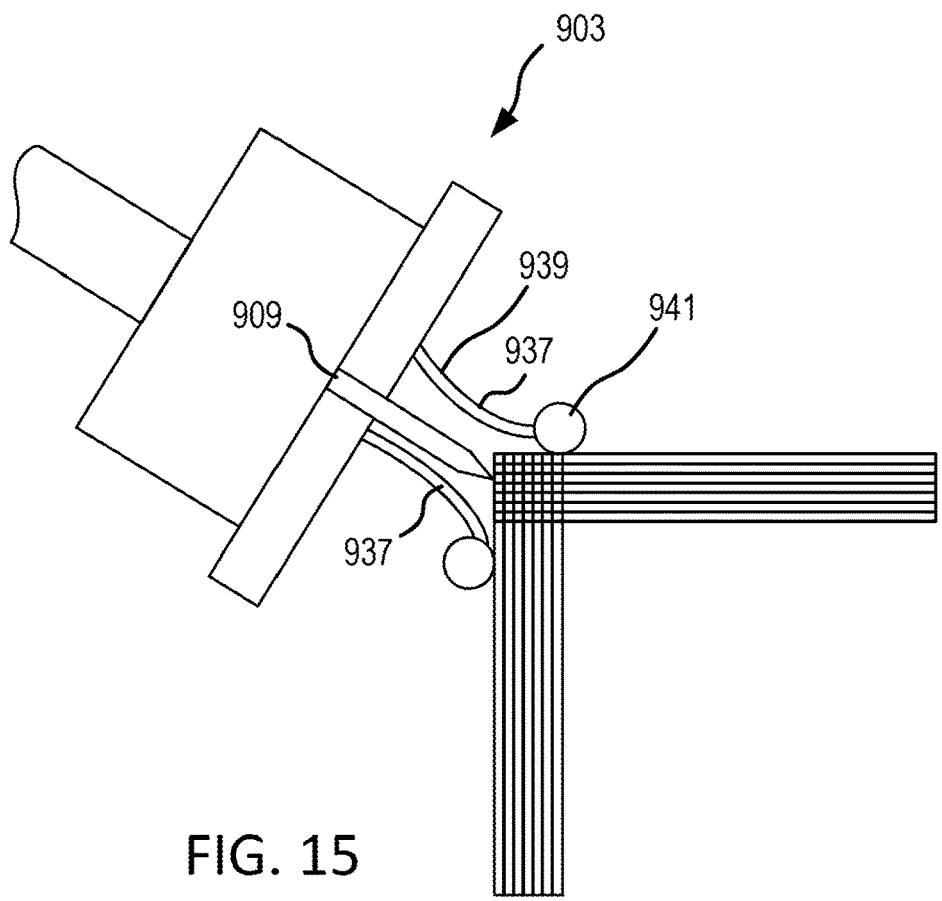

With reference to FIG. 14 and FIG. 15, end effectors 902 and 903, respectively are illustrated having preform tensioners 936 and 937, respectively, in accordance with various embodiments. In various embodiments, preform tensioners 936 and 937 may be provided in place of, or in addition to, the presser feet as described herein. In various embodiments, preform tensioners 936 and 937 comprise leaf springs 938 and 939, respectively, having rollers 940 and 941, respectively, disposed at the ends thereof. In various embodiments, preform tensioners 936 and 937 are disposed at opposite ends of the needles 908 and 909, respectively. Preform tensioners 936 and 937 may provide localized preform tension during the through thickness reinforcement process. In this regard, rollers 940 and 941 may be configured to contact the fibrous preform, thereby causing the leaf springs 938 and 939 to flex and exert a tension force on the fibrous preform.

Systems and methods of the present disclosure include a tool for producing composite preforms with tailored in-plane and interlaminar properties. Systems and methods of the present disclosure enable the ability to needle on a complex contour preform. Systems and methods of the present disclosure allow for precisely controlling and programing needling location, angle, depth, and areal density. Systems and methods of the present disclosure allow spatially varying the needling parameters to vary interlaminar versus in-plane properties based on the desired application. Systems and methods of the present disclosure enable fabrication of 2.5D and 3D complex contour composite preforms for aerospace structures. Systems and methods of the present lend themselves to fully automated fabrication to reduce costs, improve reproducibility, and scale to production rates.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An end effector for through thickness reinforcement of a fibrous preform, the end effector comprising:
    a body;
    a first presser foot and a second presser foot mounted to the body and moveable with respect to the body;
    a first needle and a second needle mounted to the body and moveable with respect to the body,
    wherein the first needle is configured to move between a first extended position and a first retracted position;
    a first sensor configured to detect whether the first presser foot has contacted the fibrous preform and whether the first presser foot is exerting a first predetermined force on the fibrous preform; and
    a second sensor configured to detect whether the second presser foot has contacted the fibrous preform and whether the second presser foot is exerting a second predetermined force on the fibrous preform, the second predetermined force being different from the first predetermined force,
    wherein the first needle extends through the first presser foot and the second needle extends through the second presser foot.

2. The end effector of claim 1, wherein the first presser foot is configured to articulate from the body between a second extended position and a second retracted position.

3. The end effector of claim 2, wherein the second presser foot is configured to articulate from the body between a third extended position and a third retracted position, wherein the first presser foot is configured to articulate independent of the second presser foot with respect to the body.

4. The end effector of claim 1, wherein the first presser foot is moveable with respect to the first needle.

5. The end effector of claim 1, wherein the first presser foot comprises a pivoting foot section pivotally mounted to a spherical joint.

6. The end effector of claim 5, further comprising a flexible material provided at an end of the pivoting foot section, wherein the flexible material extends between adjacent pivoting foot sections.

7. The end effector of claim 1, further comprising a spring member configured to bias at the first presser foot.

8. The end effector of claim 2, further comprising an actuator for moving the first presser foot between the second extended position and the second retracted position.

9. The end effector of claim 1, further comprising an actuator for moving the first needle between the first extended position and the first retracted position.

10. The end effector of claim 1, further comprising a preform tensioner configured to contact the fibrous preform to apply tension to the fibrous preform while the needle moves between the first extended position to the first retracted position.

11. The end effector of claim 1, further comprising a robotic arm and wherein the body is coupled to the robotic arm.

12. The end effector of claim 1, wherein the first sensor and the second sensor are each multi-axial sensors and each configured to measure force in at least two directions.

13. The end effector of claim 3, wherein the independent articulation allows for the third extended position to be greater than the second extended position in response to the first presser foot and the second presser foot contacting a curved preform.

14. The end effector of claim 1, wherein the first needle and a second needle are configured to extend toward and to contact the preform at a non-orthogonal angle.

15. The end effector of claim 1, wherein the first needle is configured to penetrate a first predetermined number of layers of the fibrous preform, wherein the second needle is configured to penetrate a second predetermined number of layers of fibrous preform, the second predetermined number being greater than first predetermined number.

16. A method for performing a process of through thickness reinforcement in a fibrous preform, the method comprising:
moving the end effector of claim 1 with respect to the fibrous preform;
moving the end effector toward the fibrous preform until the first presser foot of the end effector contacts the fibrous preform;
moving the first needle of the end effector from the first retracted position to the first extended position;
penetrating the fibrous preform with the first needle in response to the first needle moving from the first retracted position to the first extended position; and
moving at least a portion of a fiber from a first layer of the fibrous preform into a second layer of the fibrous preform in response to the first needle penetrating the fibrous preform.

17. The method of claim 16, further comprising:
receiving, by a control unit, a feedback signal from the first sensor indicating a pressure exerted by the first presser foot onto the fibrous preform.

18. The method of claim 16, further comprising:
orienting the first needle at a non-orthogonal angle with respect to the fibrous preform; and
moving the second presser foot of the end effector from a second retracted position to a second extended position.

19. The method of claim 16, further comprising:
receiving, by a control unit, a feedback signal from the first sensor indicating a pressure exerted by the first needle onto the fibrous preform.

\* \* \* \* \*